(12) United States Patent
Flore et al.

(10) Patent No.: US 10,882,128 B2
(45) Date of Patent: Jan. 5, 2021

(54) MACHINE AND METHOD FOR SPARK EROSION MACHINING OF A GEROTOR PUMP

(71) Applicant: Safran Aero Boosters SA, Herstal (BE)

(72) Inventors: David Flore, Evegnée (BE); Philippe Peiffer, Stembert (BE); Olivier Van Den Abeele, Tihange (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 387 days.

(21) Appl. No.: 15/906,459

(22) Filed: Feb. 27, 2018

(65) Prior Publication Data

US 2018/0250760 A1    Sep. 6, 2018

(30) Foreign Application Priority Data

Mar. 2, 2017  (BE) .................... 2017/5127

(51) Int. Cl.
*B23H 7/26* (2006.01)
*B23H 1/02* (2006.01)
*B23H 11/00* (2006.01)
*B23H 9/00* (2006.01)
*F04C 2/08* (2006.01)
(Continued)

(52) U.S. Cl.
CPC ............... *B23H 1/02* (2013.01); *B23H 9/003* (2013.01); *B23H 11/003* (2013.01); *F04C 2/084* (2013.01); *F04C 2/10* (2013.01); *B23H 7/02* (2013.01); *F04C 2230/102* (2013.01)

(58) Field of Classification Search
CPC ... B23H 7/34; B23H 7/36; B23H 1/08; B23H 1/10; B23H 11/003; B23H 9/003; F04C 2230/102
See application file for complete search history.

(56) References Cited

U.S. PATENT DOCUMENTS 2,832,633 A * 4/1958 Compson .................. B66C 1/54
                                                    294/97
4,414,456 A * 11/1983 Inoue ..................... B23H 7/101
                                                    204/206
(Continued)

FOREIGN PATENT DOCUMENTS

JP    S5937019 A    2/1984
JP    S62114826 A   5/1987
(Continued)

OTHER PUBLICATIONS

European Search Report for Belgium Appl. No. BE 2017/5127 dated Oct. 24, 2017.

*Primary Examiner* — Paul R Durand
*Assistant Examiner* — Randall A Gruby
(74) *Attorney, Agent, or Firm* — James E. Walton

(57) ABSTRACT

A spark erosion machine includes a frame with a space for spark erosion of a workpiece, a wire for cutting by spark erosion, and a wire guide head for guiding the wire across the workpiece, so as to detach an offcut from it; an offcut support mounted movably relative to the guide head, the support being configured to move at least between a retention position under the spark erosion space, where it can collect the offcut, and a retracted position; and an offcut extractor.

19 Claims, 4 Drawing Sheets

(51) Int. Cl.
*F04C 2/10* (2006.01)
*B23H 7/02* (2006.01)

(56) References Cited

U.S. PATENT DOCUMENTS

| | | | | |
|---|---|---|---|---|
| 4,507,837 | A * | 4/1985 | Hinkle | B25B 27/023 |
| | | | | 29/262 |
| 4,698,475 | A * | 10/1987 | Lothenbach | B23H 7/02 |
| | | | | 198/867.04 |
| 4,742,205 | A * | 5/1988 | Vuichard | B23H 7/02 |
| | | | | 219/69.1 |
| 4,745,253 | A * | 5/1988 | Girardin | B23H 7/02 |
| | | | | 204/206 |
| 4,752,665 | A * | 6/1988 | del Santo | B23H 7/02 |
| | | | | 219/69.1 |
| 4,960,971 | A * | 10/1990 | Kawanabe | B23H 11/003 |
| | | | | 219/69.12 |
| 5,095,635 | A * | 3/1992 | Iwasaki | B23H 11/003 |
| | | | | 33/567 |
| 5,164,563 | A * | 11/1992 | Aso | B23H 7/02 |
| | | | | 219/69.12 |
| 5,183,987 | A * | 2/1993 | Aso | B23H 7/02 |
| | | | | 219/69.12 |
| 6,333,480 | B1 * | 12/2001 | Watanabe | B23H 7/02 |
| | | | | 219/69.12 |
| 7,669,905 | B1 * | 3/2010 | Kondo | B66C 1/54 |
| | | | | 294/117 |
| 8,814,240 | B2 * | 8/2014 | Hedley | B66C 1/66 |
| | | | | 294/97 |
| 9,421,627 | B2 * | 8/2016 | Otomo | B23H 7/36 |
| 9,737,945 | B2 * | 8/2017 | Nakajima | B23H 1/04 |
| 10,471,528 | B2 * | 11/2019 | Tomioka | G05B 19/406 |
| 10,632,554 | B2 * | 4/2020 | Oosawa | B23H 11/003 |
| 2002/0015653 | A1 | 2/2002 | Weisener | |
| 2002/0096897 | A1 * | 7/2002 | Comardo | B66C 1/54 |
| | | | | 294/95 |
| 2013/0277347 | A1 * | 10/2013 | Yamaguchi | B23H 11/003 |
| | | | | 219/158 |
| 2015/0108093 | A1 * | 4/2015 | Yamane | B23H 7/101 |
| | | | | 219/69.12 |
| 2015/0129558 | A1 * | 5/2015 | Otomo | B23H 7/10 |
| | | | | 219/69.12 |
| 2016/0263689 | A1 * | 9/2016 | Kasai | B23H 11/00 |
| 2018/0104757 | A1 * | 4/2018 | Yamaguchi | B23H 11/003 |
| 2019/0001506 | A1 * | 1/2019 | Blixt | B25J 15/0047 |
| 2019/0168325 | A1 * | 6/2019 | Tsai | B23H 3/02 |
| 2019/0283160 | A1 * | 9/2019 | Samo | B23H 11/006 |

FOREIGN PATENT DOCUMENTS

| | | |
|---|---|---|
| JP | H02160421 A | 6/1990 |
| JP | H0655351 A | 3/1994 |
| WO | 2008106198 A1 | 9/2008 |

* cited by examiner

MACHINE AND METHOD FOR SPARK EROSION MACHINING OF A GEROTOR PUMP

This application claims priority under 35 U.S.C. § 119 to Belgium Patent Application No. 2017/5127, filed 2 Mar. 2017, titled "Machine and Method for Spark Erosion Machining of a Gerotor Pump," which is incorporated herein by reference for all purposes.

BACKGROUND

1. Field of the Application

The present application relates to the field of spark erosion machining. More precisely, the present application relates to the retention and removal of an offcut produced by spark erosion.

2. Description of Related Art

Spark erosion machining may be used to produce complex shapes with high precision. This technology may be used, notably, to cut a toothed ring inside a plate forming an initial material. In this context, the wire acting as a moving electrode travels around the toothed ring until the latter becomes detached and falls. However, this offcut is uncontrolled, to the extent that the toothed ring that is detached may trap the electrode wire. A defect may then occur.

The document U.S. Pat. No. 4,752,665A discloses a machine for spark erosion machining. The machine comprises a recovery plate which is fixed to the lower arm from which the wire extends. The plate is placed under the raw workpiece so as to retain its offcuts, thereby preventing the latter from falling in an uncontrolled way against the machining wire. When the workpiece holder is retracted, the offcuts are pulled along by the initial raw workpiece, remaining in their respective cavities, until they fall into the receptacle provided for this purpose. As an alternative, the machine comprises a gripper for gripping and removing conical offcuts from above. However, this machine is bulky. In particular, it requires a large clearance between the lower arm and the gripper for retaining the raw workpiece.

The documents U.S. Pat. No. 4,742,205A, JP02160421A, JPH0655351A, and WO2008106198A1 teach machines for spark erosion machining Although great strides have been made in the area of spark erosion machining, many shortcomings remain.

DETAILED DESCRIPTION OF THE PREFERRED EMBODIMENT

Figure 1:
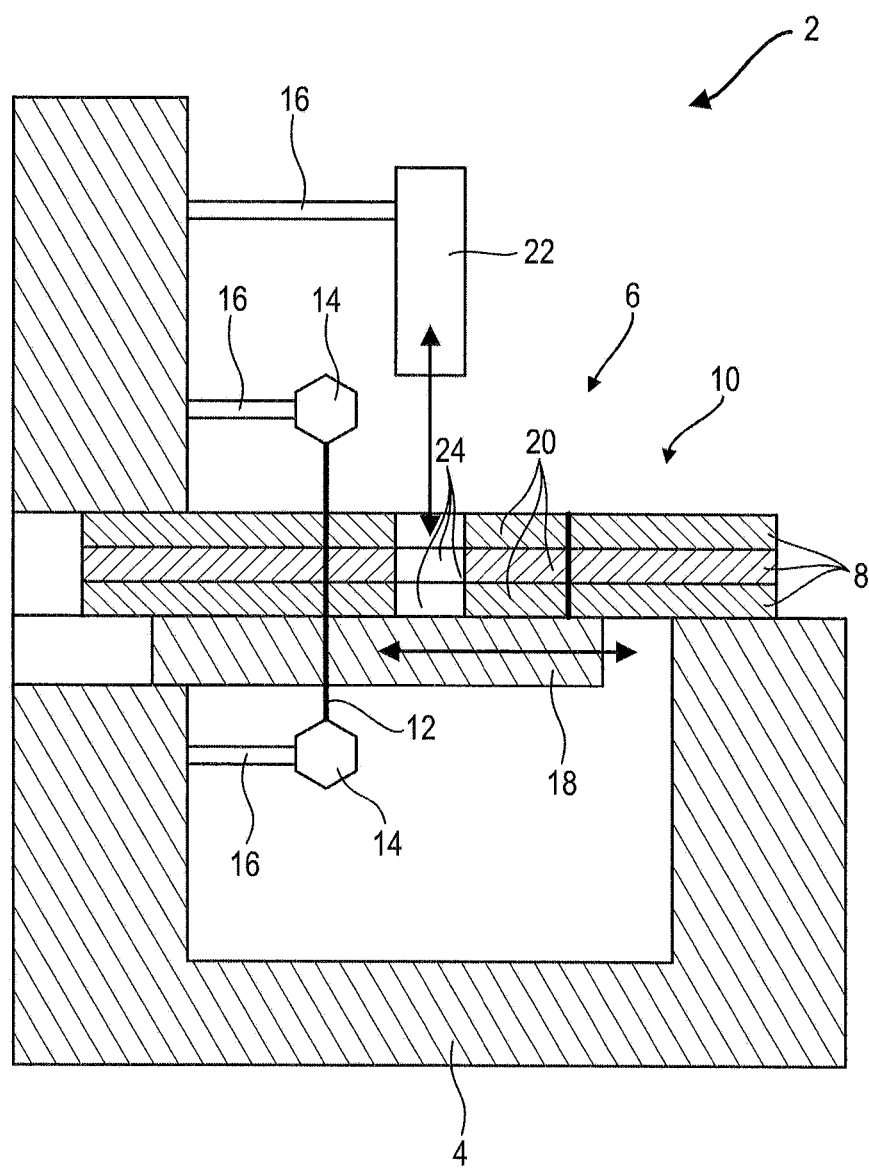
FIG. 1 shows a machine for spark erosion machining according to the present application.

The present application aims to resolve at least one of the problems posed by the prior art. More precisely, the object of the present application is to improve the compactness of the machine for spark erosion machining equipped with an offcut retention device. Another object of the present application is to propose a solution which is strong, light, economical, reliable, easily maintained, and simple to inspect, and which improves efficiency.

The present application proposes a machine for spark erosion machining, notably for producing the toothing of a gerotor pump, the machine comprising a frame with a space for spark erosion of a workpiece, a wire for cutting by spark erosion, and a guide for guiding the wire across the workpiece so as to detach an offcut from it, the machine being remarkable in that it further comprises an offcut support mounted movably relative to the guide, the support being configured to move at least between a retention position under the spark erosion space, where it can collect the offcut, and a retracted position.

According to advantageous embodiments of the present application, the machine may have one or more of the following characteristics, considered in isolation or in all technically feasible combinations:

The support is movable in a plane perpendicular to the wire, the support being configured if necessary to move between the position occupied by the wire and a position at a distance from the wire, said positions corresponding, notably, to the offcut retention position and the retracted position, respectively.

The support comprises a notch such that the wire is outside said notch in the retracted position, and is engaged in said notch in the retention position, said notch having an enlargement if necessary.

The support is fork-shaped, with two parallel branches for supporting the offcut.

The support comprises a horizontal upper surface for receiving the offcut.

The machine comprises an offcut extractor capable of entering the offcut.

The extractor comprises an expandable portion, formed if appropriate by two levers that can move relative to one another to lock the offcut.

The machine comprises a workpiece fixing device, said device being fixed relative to the frame.

The support is movable relative to the frame, and/or the guide is movable relative to the frame of the machine.

The support is movable relative to the wire.

The tool holder is fixed relative to the frame, and/or the support is movable relative to said frame.

The extractor is expandable in the direction of movement of the support and/or perpendicularly to the wire.

The main directions of movement of the support and the extractor are perpendicular.

The presence of the support and the head are not indispensable features of the present application. The present application also proposes a machine for spark erosion machining, notably for producing the toothing of a gerotor pump, the machine comprising a frame and a wire for cutting by spark erosion, said wire being designed to be moved across a raw workpiece so as to detach an offcut from it, the machine being remarkable in that it further comprises an offcut extractor that can be introduced into the offcut and/or pass from one side of the offcut to another.

The present application also proposes a method of spark erosion machining, notably for pump toothing, the method comprising the following steps, executed in the following order if appropriate: (a) fixing at least one initial workpiece in a machine for spark erosion machining with a frame and a spark erosion machining wire retained by a guide, and (b) machining the workpiece with the aid of the wire so as to separate an offcut from the initial workpiece, the method being remarkable in that the machine comprises a movable support, the method further comprising a step (c) of moving the movable support under the offcut so as to stop the gravitational descent of the offcut when it is detached from the initial workpiece, the machine being made according to the present application if appropriate.

According to advantageous embodiments of the present application, the method may have one or more of the following characteristics, considered in isolation or in all technically feasible combinations:

The offcut comprises an aperture and the machine comprises an extractor, the method further comprising an introduction step (d) in which the extractor enters the aperture so as to retain the offcut.

The aperture extends through the offcut, and the extractor passes through the offcut in the introduction step (d).

The method further comprises a step (e) of extracting the offcut by lifting it with the aid of the extractor.

At the end of the machining step (b), the initial workpiece forms a closed loop around the offcut, notably around the contour of the offcut.

In the fixing step (a), a number of initial workpieces are fixed in the machining machine so as to form a stack of initial workpieces, and in the machining step (b) the wire simultaneously machines each initial workpiece in the stack so as to form offcuts there.

At the end of the machining step (b), the offcuts are identical.

At the end of the machining step (b), the contour of the offcut is enclosed in the workpiece.

In the introduction step (d), the extractor is positioned in the enlargement of the notch in the support.

The present application also proposes a procedure for manufacturing a gear pump comprising an inner toothed ring and an outer toothed ring, characterized in that the inner toothed ring and/or the outer toothed ring are machined by a method of spark erosion machining according to the present application, the procedure further comprising a step (g) of fitting the inner toothed ring into the outer toothed ring.

According to an advantageous embodiment of the present application, in the fitting step (g) the inner toothed ring and/or the outer toothed ring comprises toothing having a shape identical to that produced at the end of the machining step (b).

According to an advantageous embodiment of the present application, in the fitting step (g) the inner toothed ring and/or the outer toothed ring comprises toothing having a chemical composition identical to that produced at the end of the machining step (b).

According to an advantageous embodiment of the present application, in the fitting step (g) the inner toothed ring and/or the outer toothed ring comprises toothing having a hardness identical to that produced at the end of the machining step (b).

In a general manner, the advantageous embodiments of each object of the present application are equally applicable to the other objects of the present application. Each object of the present application may be combined with the other objects, and the objects of the present application may also be combined with the embodiments of the description, which may also be combined with one another, in all technically possible combinations.

The present application may be used to increase the level of automation of spark erosion machining. Subsequent adjustment operations become optional. The support and the extractor, independently of one another, each provide a benefit contributing to automation. Thus the present application may be used to simplify computer programs for machining, since the respective movements between the guide and the support are simpler to parameterize.

In the present present application, spark erosion machining is taken to mean a method of machining or cutting out which consists in removing material from a workpiece by using electric discharges. This method is commonly referred to by the abbreviation EDM, standing for the English expression "Electrical Discharge Machining". It is particularly suitable for removing material from electrically conductive workpieces such as metal or graphite workpieces.

The longitudinal direction may be the direction of movement of the support between its retention position and its retracted position. The vertical direction may be the direction of insertion of the extractor into an offcut.

FIG. 1 shows, in a simplified manner, a machine 2 for spark erosion machining.

The machine 2 comprises, in a conventional way, a frame 4 and a spark erosion space 6 which receives at least one workpiece 8, or a plurality of workpieces 8, for cutting. Each workpiece 8 may be an initial workpiece and/or a raw workpiece. In this case, three workpieces 8 are superimposed to form a stack 10, but the stack may contain more or fewer workpieces 8. These workpieces 8 may be plates, for example steel plates. The workpieces 8 in the stack 10 are fixed to the frame 4 by means of flanges or jaws (not shown), to immobilize them while material is removed from them by spark erosion. The machine 2 may also comprise a liquid (not shown) in which one or each workpiece 8 is immersed in order to allow the spark erosion phenomenon to take place.

The machine 2 comprises an elongated cutting electrode such as a wire 12 or a ribbon. The potential difference between the wire 12 and each workpiece 8 enables spark erosion cutting to take place. In order to follow a predefined path and thus cut a desired shape in each workpiece 8, the wire 12 is retained by guides 14, including an upper guide and a lower guide distributed on either side of the stack 10. These guides 14, also called guide heads, may be guides which are movable relative to the frame 4, making it possible to follow the desired track when the stack 10 is immobilized relative to the frame 4. For this purpose, movable arms 16 drive the guides 14. The extreme positions of the wire 12 may delimit the spark erosion space 6.

The machine 2 may include a control unit (not shown) for moving the guides 14, and therefore the wire 12, along the track defined by a machining sequence. On the other hand the wire 12 may travel perpendicularly to the stacking direction, and/or from one guide 14 towards the other guide. This enables the wire 12 to be renewed during the cutting.

Optionally, the machine 2 comprises a movable support 18. The support 18 is positioned under the spark erosion space 6, and therefore under the stack 10. In this position, the support 18 is able to retain each offcut 20 detached from the initial workpiece 8. In fact, when the wire 12 completes a closed loop, each offcut 20 can slide downwards by gravity. Optionally or alternatively, each offcut may turn over. The movement of each offcut 20 may exert a force on the wire 12 which presents a risk of marking the offcut 2 and the rest of the workpiece 8, resulting in one or more defects. According to the present application, it may be considered that the mechanical element to be produced is the workpiece 20 or the remainder of the workpiece 2 after the removal of the offcut 20.

Optionally, the machine 2 comprises an extractor 22. The latter may be actuated with the aid of an arm 16. The extractor 22 is adapted to recover each offcut 20 after it has been detached and descended on to the support 18. The extractor 22 is adapted to recover all the offcuts 20 in the form of a stack of offcuts. This recovery may be carried out by means of apertures 24 formed in each workpiece 8, for example in the centre of each offcut 20. The apertures may be aligned so as to allow the extractor 22 to be introduced into the stack 10.

Figure 2:
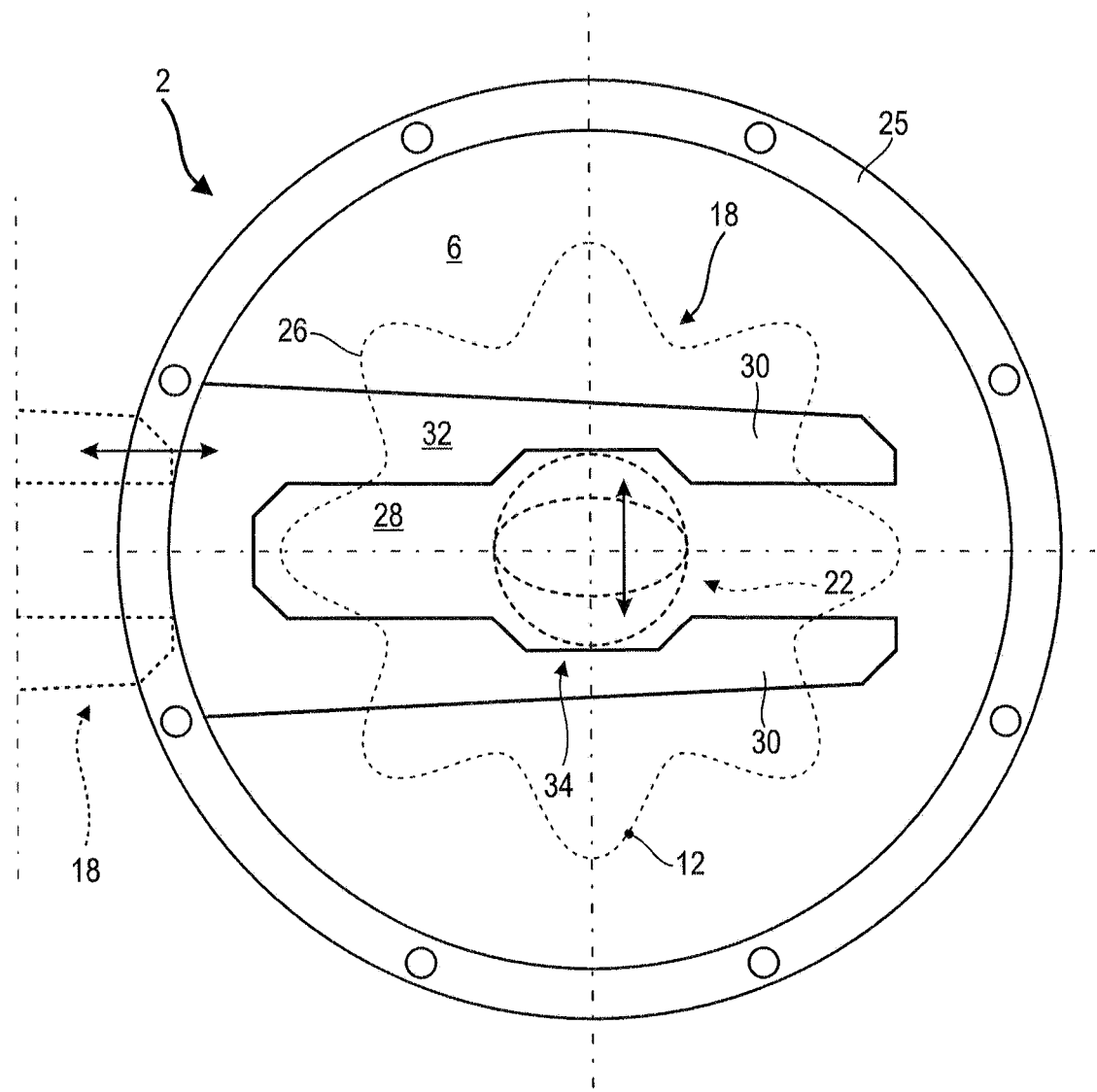
FIG. 2 shows a spark erosion space of the machining machine of FIG. 1.

FIG. 2 shows a portion of a machine 2 for spark erosion machining. The machine 2 may be identical to that shown in FIG. 1. The spark erosion space 6 and the support 18 are seen from above, and the workpiece and offcut are omitted for the sake of clarity. However, the cutting path 26 followed by the wire 12 is indicated by a broken line. A flange 25 for fixing the stack is visible.

In this case, the cutting path 26 may be used to form a toothed ring, for example a toothing of a pinion pump (not shown). The pump may be a gerotor pump, which comprises, in a known way, an outer ring with internal toothing which receives an inner ring with external toothing. The inner ring is eccentric and has fewer teeth than the outer ring.

The support 18 is shown under the spark erosion space 6, in the form of a continuous line. In this position, the support 18 is able to retain an offcut when it becomes detached. This position is thus a retention position or a blocking position. In this case, the support 18 passes through most of the space 6, but a smaller proportion may be sufficient to prevent an uncontrolled movement of an offcut.

The support 18 is also shown in broken lines in a retracted position, outside the boundary of the space 6. In this position, the free end of the support 18 is at a distance from the cutting path 26. The support 18 may be at a distance from the wire 12.

The support 18 may generally be a plate. It may have a notch 28, for example a longitudinal notch. The present movement of the support 18 is a translation in this case, but it could be a rotary movement.

The support 18 may form a fork. It may have two branches 30, on either side of the notch 28. Each branch 30 may extend over most of the support 18, or at least over most of the upper surface 32 of the support 18 that comes into contact with an offcut at the time of detachment. The notch 28 may also have an enlargement 34.

The position of the enlargement 34 may coincide with that of the apertures if appropriate. The location of this enlargement 34 may also be adapted to receive the extractor 22 (shown in broken lines) when it passes through the stack and the support 18 is in the retention position. The lower end of the extractor 22 is also shown in two sizes, since the extractor is expandable.

Figure 3:
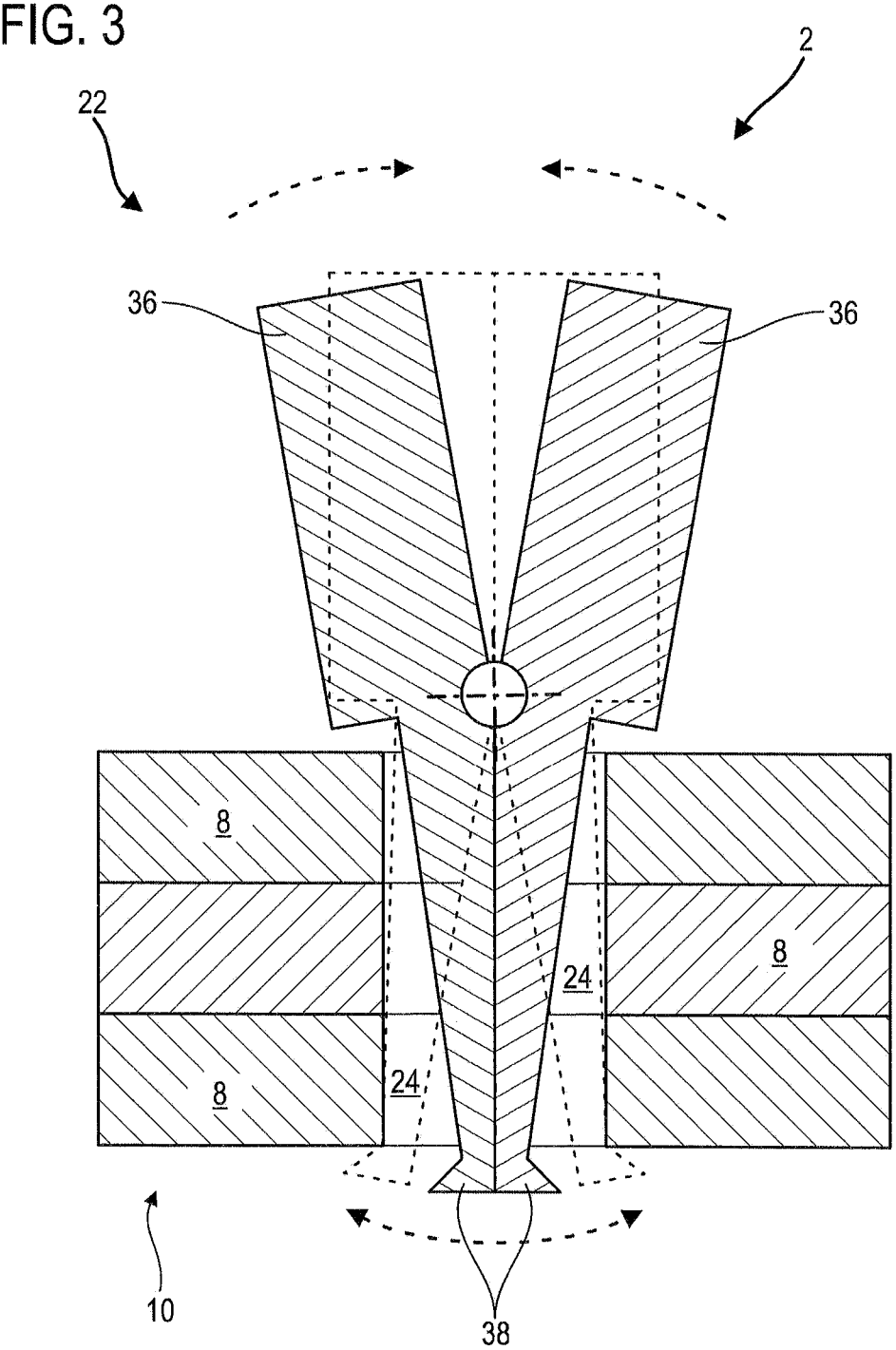
FIG. 3 is a sketch of an offcut extractor of the machining machine of FIG. 1.

FIG. 3 is a sketch of a portion of a machine for spark erosion machining. The machine 2 may be identical to that shown in FIGS. 1 and 2. The extractor 22 passes through the stack 10 of workpieces 8 via the apertures 24. The set of apertures 24 forms a passage through the stack 10.

The extractor 22 is expandable, notably inside the stack 10. As it increases in size, it becomes wedged in one, or each, of the apertures 24. It can lock each offcut by friction. When it is raised, it carries the offcuts with it. The extractor 22 may be made of movable parts that move away from one another in order to mate with the apertures 24.

By way of example, the extractor 22 may comprise two levers 36 which pivot relative to one another. It may be scissor-shaped. As they swing and approach the inner surface of an aperture 24, the levers 36 lock the aperture 24 and are adapted to lift the workpiece 8 or the corresponding offcut. Projections 38 at the lower ends further improve the security of retention. The extraction becomes more secure.

The extractor 22 may be movable with a number of movements. It may be movable in a vertical direction of insertion into the stack, and in a movement of expansion. The extractor 22 is in a position of engagement in the stack 10 in FIG. 3, whereas it is in a position of disengagement in FIG. 1.

Figure 4:
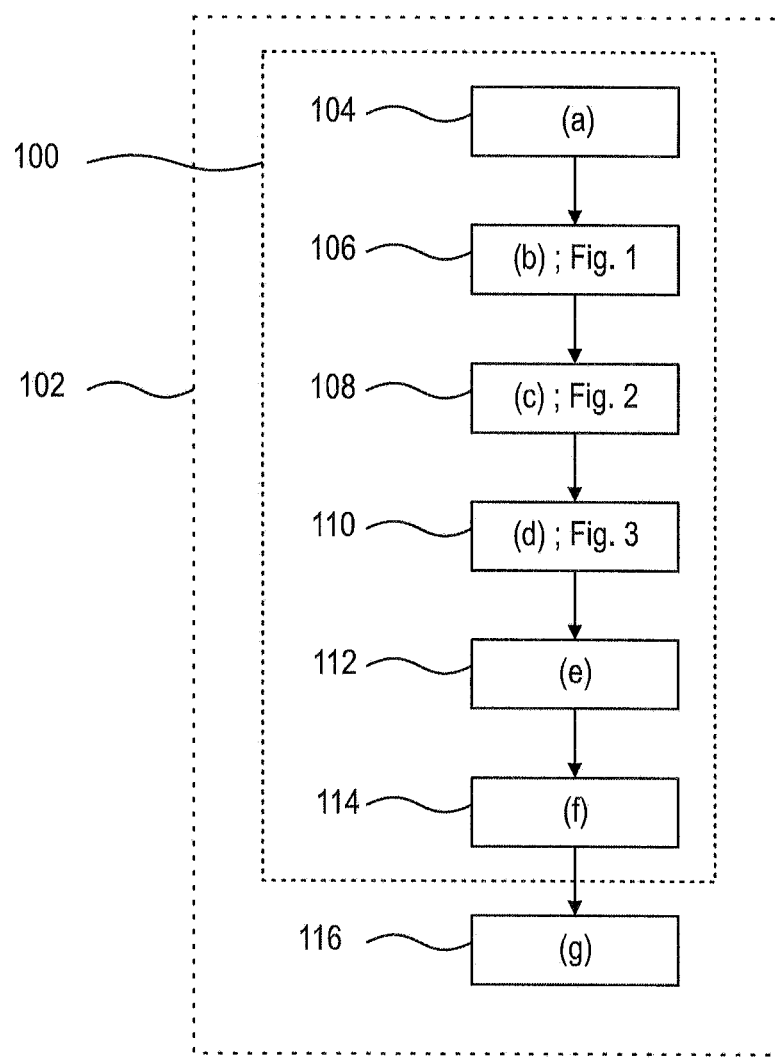
FIG. 4 is a diagram of the method for spark erosion machining and a procedure for manufacturing a gear pump according to the present application.

FIG. 4 shows a diagram of a method 100 for spark erosion machining using a machine for spark erosion machining. The method 100 may form part of a procedure 102 for manufacturing a gear pump. The machine used may be in accordance with any of those described in relation to any of FIGS. 1 to 3.

The method 100 may comprise the following steps, which may be executed in the following order if appropriate:

(a) fixing 104 a stack of initial workpieces in the machine for spark erosion machining;

(b) machining 106 the workpieces by means of the wire so as to detach a number of offcuts of the initial workpieces;

(c) moving 108 the movable support under the offcuts to reduce their gravitational descent that occurs on their detachment, and to block any movements of these offcuts;

(d) introducing 110 the extractor into the apertures;

(e) extracting 112 the offcut by lifting it with the aid of the extractor;

(f) retracting 114 the support beyond the boundaries of the spark erosion space.

Before the fixing step (a), each workpiece may be cut so as to form an aperture therein. In a pump, this aperture may be used to drive the corresponding ring in rotation. In this case, the workpieces are pressed against one another, using fixing flanges. The workpieces may be fixed freely to one another.

At the end of the machining step (b) 106, each initial workpiece forms a closed loop around its offcut, notably around the contour of its offcut. This feature may make it necessary to extract the offcut from above. In the machining step (b) 106, the wire simultaneously cuts all the workpieces in the stack so as to form offcuts therein. The offcuts are formed at the same time, and may be similar. The remaining parts of the workpieces may also be similar.

When the machining reaches a point where an offcut is ready to be detached, the support is brought out in the moving step (c) 108. A clearance of between 0.05 mm and 5 mm may be provided between the top of the support and the underside of the lower workpiece.

The machining step (b) 106 continues until each offcut is detached. In this state, each offcut rests on the support or on other offcuts. The extractor is then introduced into the stack in the introduction step (d) 110, as shown in FIG. 3. The extractor may partially enter the stack, and may pass all the way through it if appropriate. The extractor then removes the offcuts by lifting them in the extraction step (e) 112. It should be noted that the expansion of the extractor may be carried out at the end of the introduction step (d) 110 or at the start of the extraction step (e) 112.

Since the offcut is removed from the stack and therefore from the spark erosion space, the support may be retracted in the retraction step (f) 114. It is therefore at a distance from any position that the wire may reach. It leaves the spark erosion space free so as not to interfere with any future machining.

After the retraction step (f) 114 of the method 100, the procedure 102 comprises a step (g) of fitting 116 the inner toothed ring in an outer toothed ring so as to form a gear pump. Each of these rings may be formed by means of steps of the method 100 for spark erosion machining.

In the fitting step (g) 116, the toothing of each of the inner and outer rings has a geometry identical to the geometry produced at the end of the machining step (b) 106. The weights of the rings remain identical from one step to the next.

In the fitting step (g) 116, the toothing of each of the inner and outer rings has an identical chemical composition, and/or an identical roughness, and/or an identical hardness to that of the state produced at the end of the machining step (b) 106. This is demonstrated by the fact that the state of a toothing such as that cut at the end of the machining step (b) 106 is suitable for direct use in a gear pump for oil.

We claim:

1. A spark erosion machine, comprising:
   a frame with a spark erosion space for the spark erosion of a workpiece;
   a wire for spark erosion cutting;
   a guide for guiding the wire through the workpiece to cut an offcut from the workpiece; and
   a support for the offcut from the workpiece, mounted movably relative to the guide, the support being structurally and functionally configured to move at least between a retracted position, and a retention position under the spark erosion space in order to collect the offcut, the support comprising:
      a notch which is configured so that, in the retracted position, the wire is outside said notch, and in the retention position the wire is engaged in said notch, wherein the notch has an enlargement in which the wire is engaged in the retention position.

2. The spark erosion machine according to claim 1, wherein the support is movable in a plane perpendicular to the wire, the support being configured to move between a position where it intersects the wire and a position at a distance from the wire, said positions corresponding to the retention position and the retracted position, respectively.

3. The spark erosion machine according to claim 1, wherein the support has two parallel branches forming a fork for supporting the offcut.

4. The spark erosion machine according to claim 1, wherein the support comprises:
   a horizontal upper surface for receiving the offcut.

5. The spark erosion machine according to claim 1, further comprising:
   an offcut extractor capable of entering the offcut through the spark erosion space.

6. The spark erosion machine according to claim 5, wherein the extractor comprises:
   an expandable portion formed by two levers movable relative to one another in order to lock the offcut.

7. The spark erosion machine according to claim 1, further comprising:
   a device for fixing workpieces, said device being fixed relative to the frame.

8. The spark erosion machine according to claim 1, wherein the support is movable relative to the frame, and the guide is movable relative to the frame of the machine.

9. A spark erosion machine, comprising:
   a frame with a spark erosion space for the spark erosion of a workpiece;
   a wire for spark erosion cutting;
   a guide for guiding the wire through the workpiece to cut an offcut therefrom;
   a support for the offcut, the support being movably mounted relative to the guide, the support being configured to move at least between a retracted position, and a retaining position under the spark erosion space in order to collect the offcut; and
   an offcut extractor with an expandable portion structurally and functionally adapted for entering the offcut and to extract the offcut from the workpiece.

10. The spark erosion machine according to claim 9, wherein the expandable portion is formed by two levers that can move relative to one another within the offcut in order to lock the offcut.

11. The spark erosion machine according to claim 9, wherein the support comprises:
   a notch which is configured so that, in the retracted position, the wire is outside said notch and, in the retention position, the wire is engaged in said notch, the notch including an enlargement in which the wire is engaged in the retention position.

12. The spark erosion machine according to claim 11, wherein the expandable portion is structurally and functionally adapted for entering in at least one of the notch and the enlargement.

13. A spark erosion machining method in a spark erosion machine having a frame with a spark erosion space for the spark erosion of an initial workpiece, a wire for spark erosion cutting of the initial workpiece, a guide for guiding the wire through the initial workpiece to cut an offcut from it, and a movable support with a notch, the spark erosion machining method comprising:
   fixing the initial workpiece in the spark erosion machine;
   machining the initial workpiece by means of the wire so as to detach an offcut therefrom; and
   moving the movable support under the offcut so as to stop the gravitational descent of the offcut when it is detached from the initial workpiece by the wire when said wire is in the notch.

14. The spark erosion machining method according to claim 13, wherein the offcut includes an aperture and the spark erosion machine includes an extractor, the method further comprising:
   an introduction step in which the extractor enters the aperture so as to retain the offcut without the movable support.

15. The spark erosion machining method according to claim 14, wherein the aperture extends through the offcut, and in the introduction step the extractor passes through the offcut.

16. The spark erosion machining method according to claim 14, further comprising:
   an extraction step of the offcut by lifting the offcut by means of the extractor.

17. The spark erosion machining method according to claim 13, wherein, at the end of the machining step, the initial workpiece forms a closed loop around the offcut, and around the wire.

18. The spark erosion machining method according to claim 13, wherein the initial workpiece is a first initial workpiece, and during the fixing step additional initial workpieces are fixed in the machining machine, so as to form a stack of initial workpieces above including the first initial workpiece, and in the machining step the wire simultaneously machines the stack so as to form a stack of identical offcuts therein.

19. The spark erosion machining method according to claim 13, wherein at the end of the machining step, an inner pump toothed ring or an outer pump toothed ring is formed.

* * * * *